UNITED STATES PATENT OFFICE 2,277,267

RESIN-FORMING THIOAMMELINE ETHER KETONE AND PROCESS FOR PREPARING SAME

Herman A. Bruson, Philadelphia, Pa., assignor to The Resinous Products & Chemical Company, Philadelphia, Pa., a corporation of Delaware No Drawing. Application April 18, 1941, Serial No. 389,205

6 Claims. (Cl. 260—248)

The present invention relates to thioammeline ethers and to a process for preparing them. The thioammeline ethers with which this invention is particularly concerned may be represented by the formula

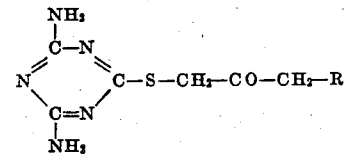

wherein R is hydrogen or a lower alkyl group.

A primary object of this invention is to provide a class of organic compounds which are capable of condensing with formaldehyde, or other aldehydes, not only on the amino groups of the triazine nucleus but also on the reactive methylene groups of the aliphatic ketonic chain, thereby producing synthetic resins which possess not only the hardness and water-resistance characteristic of the polyamino triazine resins, but also the properties of toughness, shock-resistance, and hardening properties characteristic of the vinyl ketones.

According to this invention, ethers of the above type are prepared by condensing thioammeline in alkaline solution with an alpha-halogenated ketone having the formula

wherein X is a halogen atom and R is hydrogen or a lower alkyl group, such as methyl, ethyl, propyl, butyl, or the like.

Particularly useful products are formed from the short-chain, aliphatic chloro-ketones, such as chloroacetone and 1-chloro-2-butanone, which are reasonably priced and commercially available, although higher homologues thereof may be used. In place of the chloro-ketones, the corresponding bromo-ketones may be used.

The condensation of the halogenated ketones and thioammeline takes place readily in the presence of a water-soluble alkaline acid-binding agent. In a preferred embodiment of this invention, thioammeline is dissolved in an aqueous solution of a water-soluble fixed alkali, for example, sodium hydroxide, potassium hydroxide, sodium carbonate, or potassium carbonate. The solution is then mixed with a molecular equivalent of the halogenated ketone and caused to react, if necessary by heating. The condensation takes place readily at temperatures from about 40° to 70° C. and completion of the reaction is hastened by rapidly stirring the mixture. The condensation products separate from the solution in crystalline form.

The following examples illustrate the invention.

Example 1

To a clear solution of 42.9 g. of thioammeline and 13.2 g. of sodium hydroxide, in 300 cc. of water, which was rapidly stirred at 55° C. under a reflux condenser, there was added dropwise during 15 minutes 28 g. of chloroacetone. The temperature rose to 60° C. during the addition. The mixture was then stirred for one-half hour longer at 60° C. During this time, a pale tan-colored crystalline product separated. The solution was cooled to 20° C. and the crystalline product filtered off by suction. The compound may be recrystallized from boiling water or from alcohol. The resulting product forms as colorless needles melting at 172° C., and has the formula:

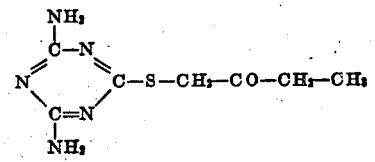

In place of sodium hydroxide an equivalent quantity of potassium hydroxide, sodium carbonate or potassium carbonate may be used.

Example 2

To a clear solution of 42.9 g. of thioammeline and 13.2 g. of sodium hydroxide in 300 cc. of water, which was rapidly stirred at 60° C. under a reflux condenser, there was added dropwise during 15 minutes 30 g. of 1-chloro-2-butanone. The mixture was stirred for one hour at 60–65° C., then cooled to 20° C., and the crystalline product (55 g.) was filtered off. The product may be purified by recrystallization from water or alcohol. It forms as colorless needles melting at 180° C., and has the formula

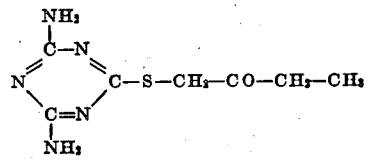

The thioammeline ethers above referred to may be reacted with formaldehyde, alone or in conjunction with urea, thiourea, melamine, dicyandiamide, phenol, m-cresol, and other resin-forming bodies to give particularly valuable resins for molding, laminating, impregnating and coating compositions.

I claim:

1. A ketone having the formula

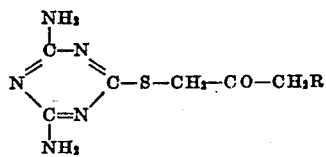

wherein R is a member of the group consisting of hydrogen and lower alkyl radicals.

2. As a new compound, a crystalline substance having the formula

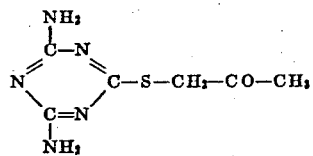

and a melting point of 172° C.

3. As a new compound, a crystalline substance having the formula

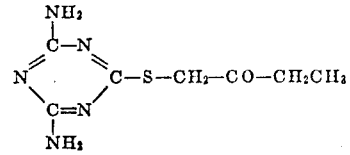

and a melting point of 180° C.

4. A process which comprises condensing thio-ammeline in alkaline solution with a halogenated ketone having the formula

wherein X is halogen and R is a member of the group consisting of hydrogen and lower alkyl radicals.

5. A process which comprises condensing thio-ammeline in a solution of an alkali metal hydroxide with chloroacetone.

6. A process which comprises condensing thio-ammeline in a solution of an alkali metal hydroxide with 1-chloro-2-butanone.

HERMAN A. BRUSON.